US012183991B2

(12) United States Patent
Lin et al.

(10) Patent No.: US 12,183,991 B2
(45) Date of Patent: Dec. 31, 2024

(54) ELECTRONIC DEVICE AND ANTENNA STRUCTURE

(71) Applicant: WISTRON NEWEB CORPORATION, Hsinchu (TW)

(72) Inventors: Hsieh-Chih Lin, Hsinchu (TW); Yung-Chieh Yu, Hsinchu (TW); Shih-Chiang Wei, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 148 days.

(21) Appl. No.: 18/047,301

(22) Filed: Oct. 18, 2022

(65) Prior Publication Data

US 2023/0291100 A1 Sep. 14, 2023

(30) Foreign Application Priority Data

Mar. 8, 2022 (TW) ................................ 111108279

(51) Int. Cl.
*H01Q 1/22* (2006.01)
*H01Q 5/307* (2015.01)

(52) U.S. Cl.
CPC ........... *H01Q 5/307* (2015.01); *H01Q 1/2283* (2013.01)

(58) Field of Classification Search
CPC ........ H01Q 5/307; H01Q 1/2283; H01Q 1/36; H01Q 1/2266; H01Q 5/328; H01Q 5/371; H01Q 1/38; H01Q 1/243; H01Q 1/48; H01Q 1/50; H01Q 5/314
See application file for complete search history.

(56) References Cited

U.S. PATENT DOCUMENTS

2010/0295737 A1* 11/2010 Milosavljevic ........ H01Q 5/371 343/702
2012/0299781 A1* 11/2012 Lee .......................... H01Q 9/42 343/700 MS
2012/0319918 A1* 12/2012 Ramachandran .... H01Q 9/0442 333/124
2013/0038494 A1* 2/2013 Kuonanoja ............. H01Q 9/42 343/745
2014/0015719 A1* 1/2014 Ramachandran ...... H01Q 1/243 343/745

(Continued)

*Primary Examiner* — Hai V Tran
*Assistant Examiner* — Bamidele A Immanuel
(74) *Attorney, Agent, or Firm* — McClure, Qualey & Rodack, LLP

(57) ABSTRACT

An electronic device having an antenna structure is disclosed. The antenna structure includes a substrate, a first radiating portion, a second radiating portion connected to the first radiating portion, a grounding portion, a shorting portion connected between the second radiating portion and the grounding portion, a third radiating portion, a first grounding extension portion connected between the third radiating portion and the grounding portion, and a first capacitive element coupled between a first section and a second section of the shorting portion. The coupling of the shorting portion, the first grounding extension portion, and the third radiating portion generates a first operating frequency band, and the coupling of the first radiating portion, the shorting portion, the first grounding extension portion, and the third radiating portion generates a second operating frequency band, which is higher than the first operating frequency band, through the matching of the first capacitive element.

15 Claims, 5 Drawing Sheets

(56) References Cited

U.S. PATENT DOCUMENTS

| | | | | |
|---|---|---|---|---|
| 2015/0200456 | A1* | 7/2015 | You | H01Q 9/42 343/750 |
| 2015/0200457 | A1* | 7/2015 | Chan | H01Q 5/357 343/700 MS |
| 2016/0056853 | A1* | 2/2016 | You | H04B 15/00 455/73 |
| 2016/0380336 | A1* | 12/2016 | Wu | H01Q 5/371 343/702 |
| 2018/0048076 | A1* | 2/2018 | Wei | H01Q 21/30 |
| 2018/0083353 | A1* | 3/2018 | Tseng | H01Q 1/245 |
| 2018/0097277 | A1* | 4/2018 | Koga | H01Q 1/523 |
| 2018/0151939 | A1* | 5/2018 | Hashimoto | H01Q 1/1271 |
| 2018/0152208 | A1* | 5/2018 | Tsai | H01Q 5/35 |
| 2018/0191060 | A1* | 7/2018 | Wu | H01Q 9/42 |
| 2018/0277925 | A1* | 9/2018 | Wu | H01Q 9/42 |
| 2018/0342809 | A1* | 11/2018 | Wu | H01Q 5/371 |
| 2019/0020111 | A1* | 1/2019 | Tseng | H01Q 5/328 |
| 2019/0131694 | A1* | 5/2019 | Lee | H04M 1/026 |
| 2019/0296446 | A1* | 9/2019 | Tseng | H01Q 9/42 |
| 2020/0168993 | A1* | 5/2020 | Wei | H01Q 1/24 |
| 2021/0013607 | A1* | 1/2021 | Tai | H01Q 1/48 |
| 2021/0075089 | A1* | 3/2021 | Chang | H01Q 1/50 |
| 2021/0075106 | A1* | 3/2021 | Samardzija | H01Q 5/378 |
| 2021/0126373 | A1* | 4/2021 | Kosaka | H01Q 9/0407 |
| 2021/0151858 | A1* | 5/2021 | Wu | H01Q 9/0457 |
| 2021/0167491 | A1* | 6/2021 | Chang | H01Q 1/48 |
| 2021/0175625 | A1* | 6/2021 | Guo | H01Q 5/335 |
| 2021/0249766 | A1* | 8/2021 | Wu | H01Q 5/48 |
| 2022/0294113 | A1* | 9/2022 | Chiang | H01Q 5/385 |
| 2023/0402757 | A1* | 12/2023 | Lin | H01Q 9/42 |

* cited by examiner

ELECTRONIC DEVICE AND ANTENNA STRUCTURE

CROSS-REFERENCE TO RELATED PATENT APPLICATION

This application claims the benefit of priority to Taiwan Patent Application No. 111108279, filed on Mar. 8, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an electronic device with an antenna structure that supports a full frequency band of LTE.

BACKGROUND OF THE DISCLOSURE

Current electronic devices, such as laptop computers or tablet computers, are trending toward thin and light on the outside but also have good communication transmission quality on the inside. However, it has become more difficult to design the antenna structure for the electronic devices because of the narrow bezel that all of the wireless products are using for the esthetic design trend.

Therefore, how to improve the structure design of the antenna in an electronic device so as to satisfy the requirement of the electronic device being thin and light while maintaining the communication quality has been an important issue of the related field.

SUMMARY OF THE DISCLOSURE

In response to the above-referenced technical inadequacy, the present disclosure provides a miniaturized antenna structure that supports a full frequency band of the LTE (Long Term Evolution) including Band 71 so as to solve the issue of dramatic decrease in the bandwidth of the antenna structure due to the use of narrow bezel in electronic devices.

In one aspect, the present disclosure provides an electronic device that includes a substrate, a first radiating portion, a second radiating portion, a grounding portion, a shorting portion, a third radiating portion, a first grounding extension portion, a feeding element, and a first capacitive element. The first radiating portion, the second radiating portion, the grounding portion, the shorting portion, the third radiating portion, the first grounding extension portion, and the feeding element are disposed on the substrate. The second radiating portion is connected to the first radiating portion. The shorting portion is connected between the second radiating portion and the grounding portion, and the shorting portion is closer to the grounding portion than the first radiating portion. The shorting portion includes a first section, a second section, and a third section. The first section is connected to the second radiating portion, and the third section is connected between the second section and the grounding portion. The first grounding extension portion is connected between the third radiating portion and the grounding portion. The feeding element is coupled between the second radiating portion and the grounding portion and is used to feed a signal. The first capacitive element is coupled between the first section and the second section. The shorting portion, the first grounding extension portion, and the third radiating portion are used to generate a first operating frequency band. The first radiating portion, the shorting portion, the first grounding extension portion, and the third radiating portion are coupled with each other and used to generate a second operating frequency band through the matching of the first capacitive element. The second operating frequency band is higher than the first operating frequency band.

In another aspect, the present disclosure provides an antenna structure that includes a substrate, a first radiating portion, a second radiating portion, a grounding portion, a shorting portion, a third radiating portion, a first grounding extension portion, and a first capacitive element. The first radiating portion, the second radiating portion, the grounding portion, the shorting portion, the third radiating portion, and the first grounding extension portion are all disposed on the substrate. The second radiating portion is connected to the first radiating portion and is used for coupling to a feeding element and feeding a signal through the feeding element. The shorting portion is connected between the second radiating portion and the grounding portion, and the shorting portion is closer to the grounding portion than the first radiating portion. The shorting portion includes a first section, a second section, and a third section. The first section is connected to the second radiating portion, and the third section is connected between the second section and the grounding portion. The first grounding extension portion is connected between the third radiating portion and the grounding portion. The first capacitive element is coupled between the first section and the second section. The shorting portion, the first grounding extension portion, and the third radiating portion generate a first operating frequency band. The first radiating portion, the shorting portion, the first grounding extension portion, and the third radiating portion couple with each other and through the matching of the first capacitive element, generate a second operating frequency band. The second operating frequency band is higher than the first operating frequency band.

Therefore, in the electronic device and the antenna structure provided by the present disclosure, by virtue of the first operating frequency band generated by the shorting portion, the first grounding extension portion, and the third radiating portion and the second operating frequency band generated by the coupling between the first radiating portion, the shorting portion, the first grounding extension portion, and the third radiating portion along with the matching of the first capacitive element, a full band of LTE, including low frequency band, can be supported.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
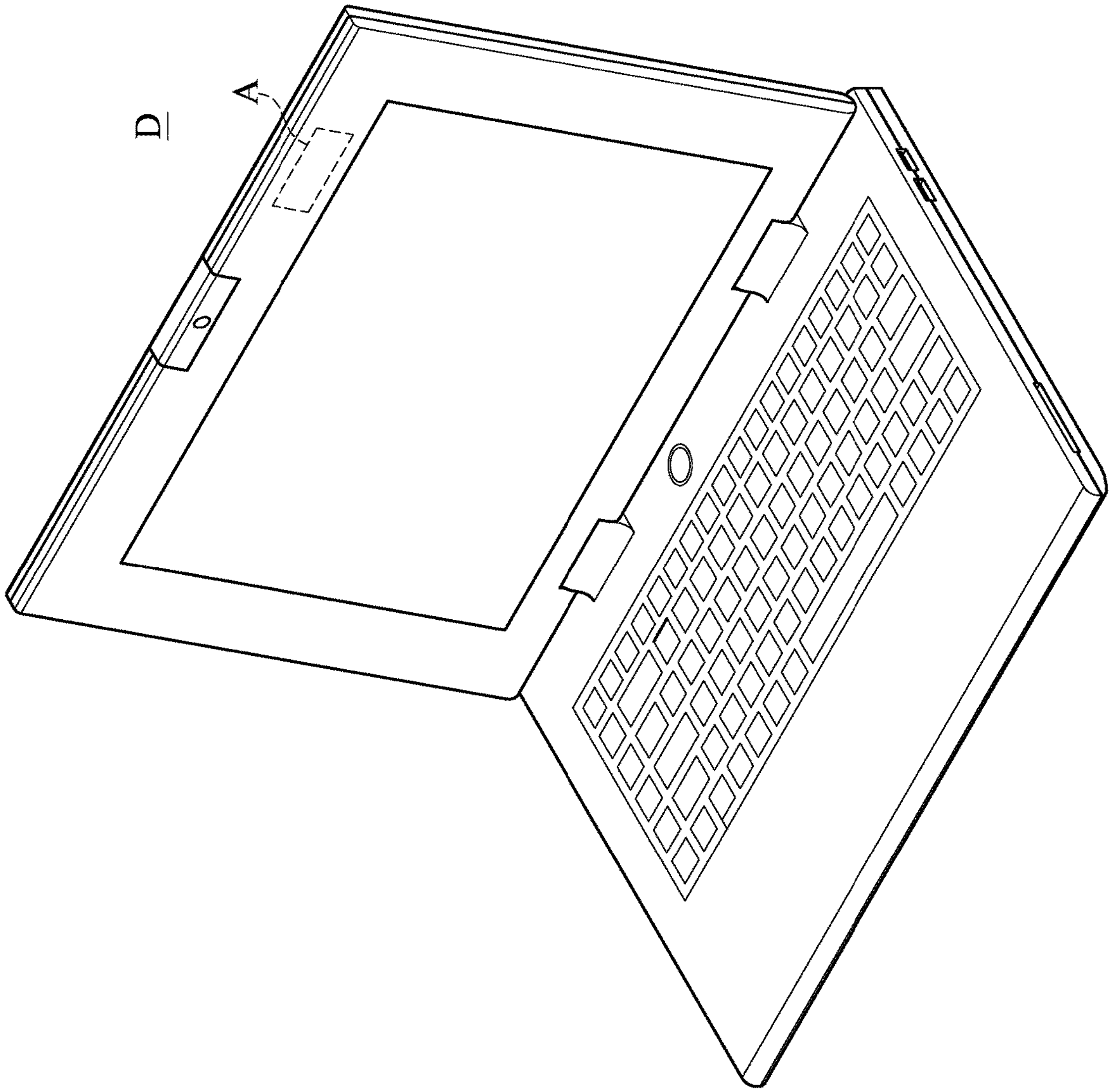
FIG. 1 is a schematic perspective view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The term "or" as used in the present disclosure may, based on the practical situations, include any one or any combination of the related items listed. In addition, the term "connect" as used in the present disclosure refers to a physical connection between two elements, and the connection can be direct or indirect. The term "couple" as used in the present disclosure refers to the excitement of the electric field energy of an element caused by the electric field energy generated by the current of another element, and as such the two elements are separated from each other and have not physical connection between them.

First Embodiment

Referring to FIG. 1, an electronic device D includes an antenna structure A, and the electronic device D is able to transmit and receive radio frequency (RF) signals through the antenna structure A. The electronic is, for example, a tablet computer or a laptop computer, but the present disclosure is not limited thereto. It is to be noted that the position of the antenna structure A in the electronic device D as shown in FIG. 1 is for illustration purpose only, not to be used in limiting the actual location of the antenna structure A.

Figure 2:
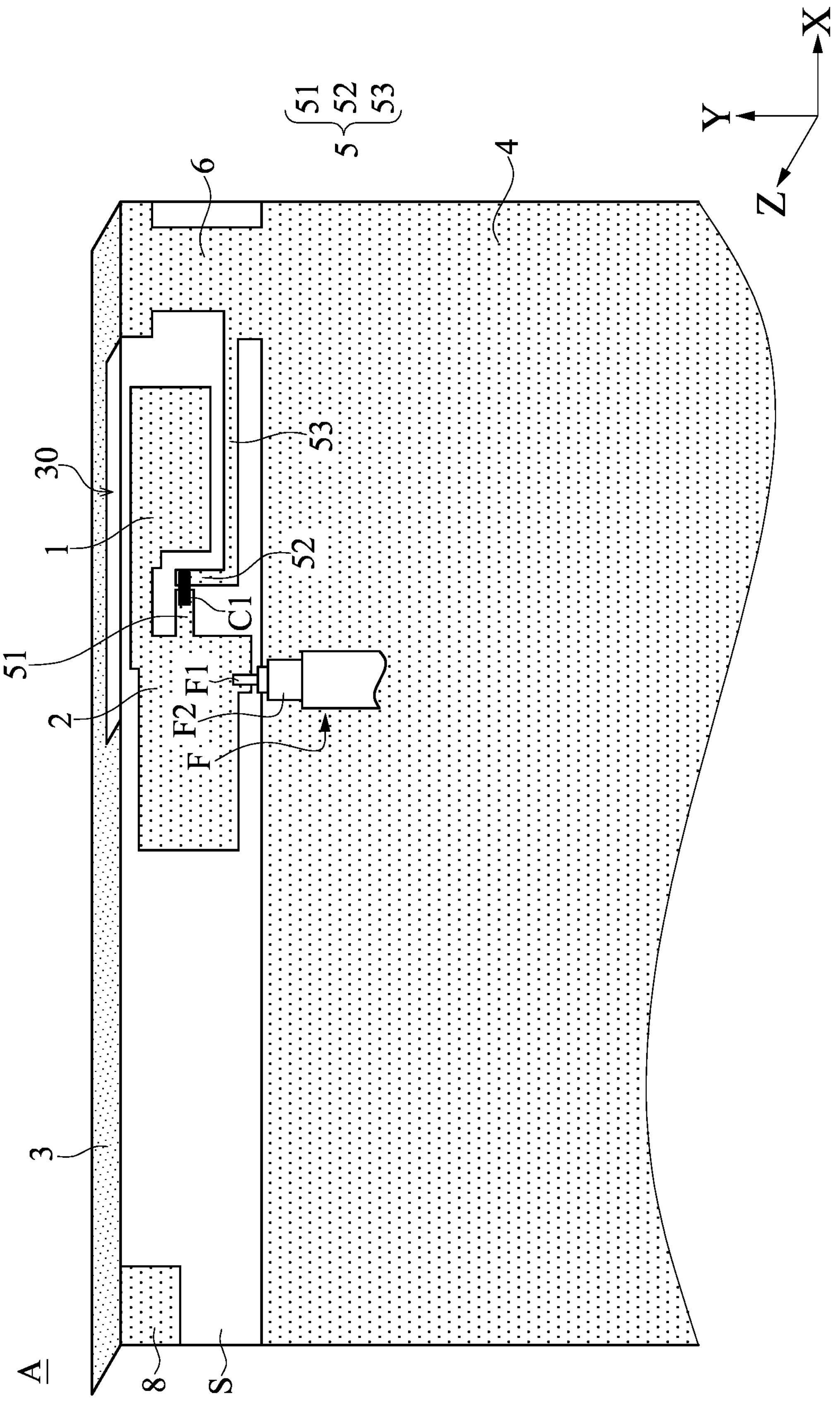
FIG. 2 is a schematic view of an antenna structure according to a first embodiment of the present disclosure.

Referring to FIG. 2, the antenna structure A includes a substrate S, and on the substrate S, there are a first radiating portion 1, a second radiating portion, 2, a third radiating portion 3, a grounding portion 4, a shorting portion 5, a first grounding extension portion 6, and a first capacitive element C1. The first radiating portion 1, the second radiating portion 2, the grounding portion 4, the shorting portion 5, the first grounding extension portion 6, and the first capacitive element C1 are disposed on the substrate S, and the third radiating portion is disposed on the edge of the substrate S. The first radiating portion 1, the second radiating portion 2, the third radiating portion 3, the grounding portion 4, the shorting portion 5, and the first grounding extension portion 6 can be conductors with electrical conductivity effect. For example, the first radiating portion 1, the second radiating portion 2, the grounding portion 4, the shorting portion 5, and the first grounding extension portion 6 can be a copper foil, the third radiating portion 3 can be a copper foil or a metal component, and the material of the substrate S can be epoxy resin glass fiber substrate (FR-4), but the present disclosure is not limited thereby. The second radiating portion 2 is connected to the first radiating portion 1. In specific, if the connecting point between the first radiating portion 1 and the second radiating portion 2 is used as a reference point, the first radiating portion 1 extends in a positive x-axis direction relative to the connecting point, and the second radiating portion 2 extends in a negative x-axis direction relative to the connecting point.

Moreover, the shorting portion 5 is connected between the second radiating portion 2 and the grounding portion 4, and the shorting portion 5 is closer to the grounding portion 4 than the first radiating portion 1 is. The first grounding extension portion 6 is connected between the third radiating portion 3 and the grounding portion 4 along the y-axis direction. In particular, the shorting portion 5 includes a first section 51, a second section 52, and a third section 53. The first section 51 is connected to the second radiating portion 2, and the third section 53 is connected between the second section 52 and the grounding portion 4. The first capacitive element C1 is coupled between the first section 51 and the second section 52, and the capacitance of the first capacitive element C1 ranges between 0.8 pF to 2.0 pF, for example, it may be 1.2 pF.

Figure 5:
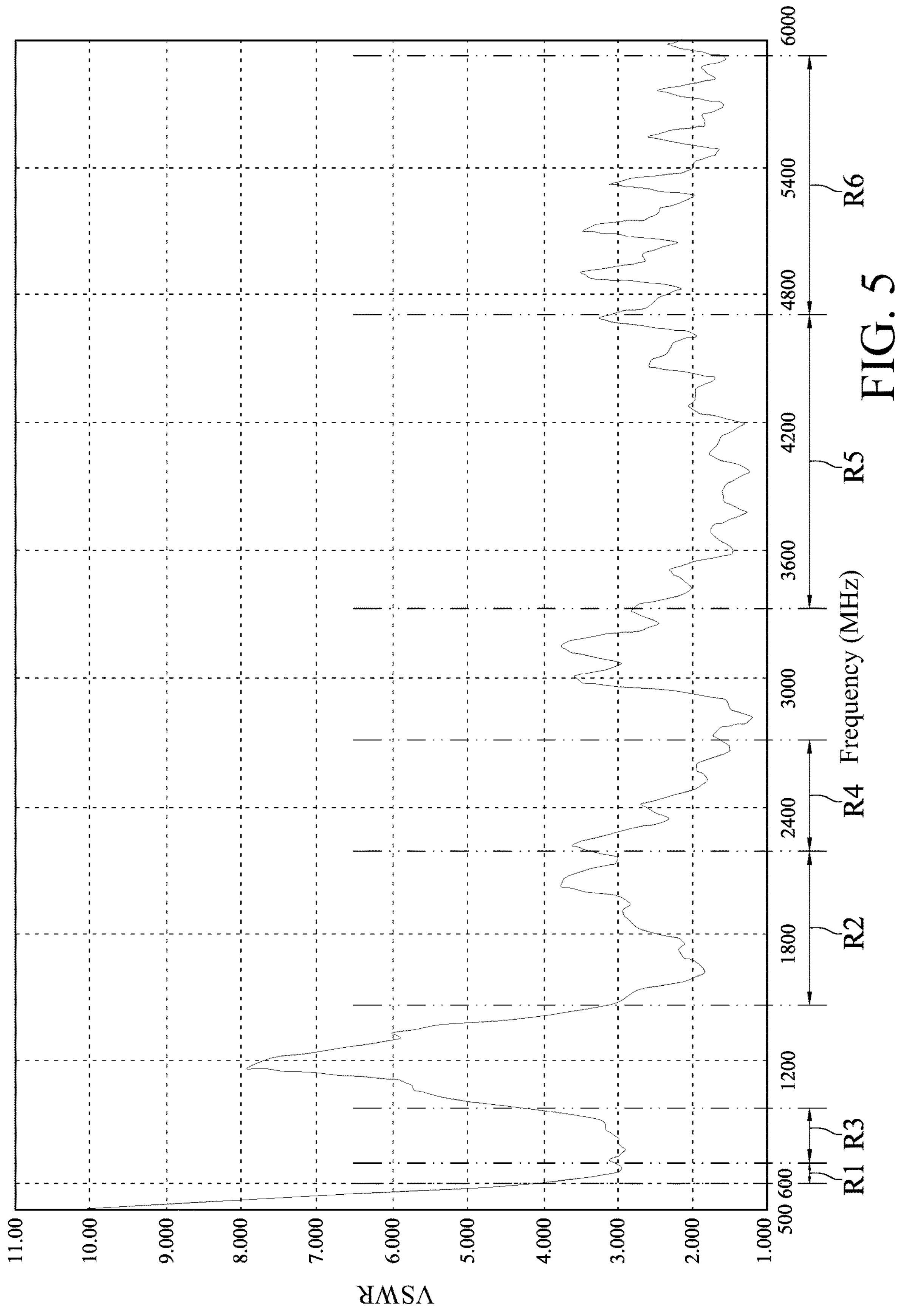
FIG. 5 is a Voltage Standing Wave Ratio (VSWR) graph illustrating the antenna structure according to the present disclosure operating at different frequencies.

Referring to FIG. 2 and FIG. 5, the electronic device D further includes a feeding element F in addition to the antenna structure A. The feeding element F is disposed on the substrate S and coupled between the second radiating portion 2 and the grounding portion 4. The feeding element F is a coaxial cable, but the present disclosure is not limited thereto. More particularly, the feeding element F has a feeding terminal F1 and a grounding terminal F2. The feeding terminal F1 is electrically connected to the second radiating portion 2, and the grounding terminal F2 is electrically connected to the grounding portion 4. The second radiating portion 2 is fed with a signal through the feeding element F, so that the shorting portion 5, the first grounding extension portion 6, and the third radiating portion 3 generate a first operating frequency band R1, and that the first radiating portion 1, the shorting portion 5, the first grounding extension portion 6, and the third radiating portion 3 couple with each other and through the matching of the first capacitive element C1, generate a second operating frequency band R2. As shown in FIG. 5, the second operating frequency band R2 is higher than the first operating frequency band R1, the first operating frequency band R1 is from 617 MHz to 698 MHz and the second operating frequency band R2 is from 1450 MHz to 2200 MHz. In addition, the third radiating portion 3 has an opening 30, and the opening 30 is adjacent to the first radiating portion 1. The placement of the opening 30 improves the impedance matching of the first operating frequency band R1. The opening 30 has a length (parallel to the x-axis) that is shorter than 45 mm, for example, it may be less than 27 mm, and a width (parallel to the z-axis) that is wider than 0.3 mm, for example, it may be more than 1 mm.

It is to be noted that the antenna structure A can have an extra extension portion 8 for connecting with the third radiating portion 3 so as to extend the coupling path of the first operating frequency band R1. As shown in FIG. 2, the extension portion 8 is disposed on the same surface of the substrate S as the other elements of the antenna structure A, but the first radiating portion 1, the second radiating portion 2, the shorting portion 5, the first grounding extension portion 6, and the first capacitive element C1 are closer to one side of the substrate S, and the extension portion 8 is closer to the opposite side of the substrate S. The placement of the extension portion 8 substantially extends the third radiating portion 3, in which the extension portion 8 can be viewed as an extending portion of the third radiating portion 3, and in turn helps to adjust the frequency offset and bandwidth of the first operating frequency band R1.

Figure 3:
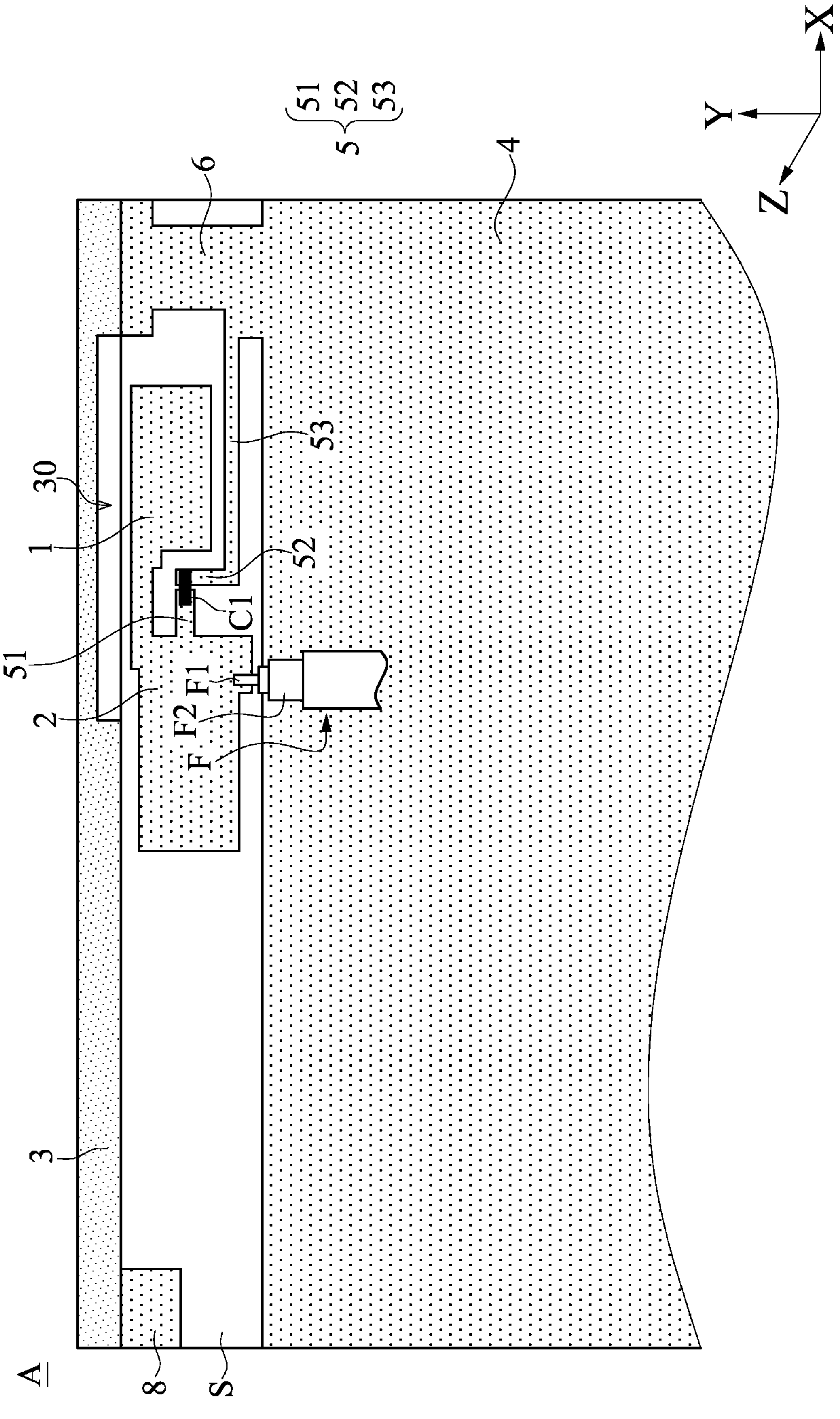
FIG. 3 is a schematic view of the antenna structure according to the first embodiment of the present disclosure put in another implementation.

Referring to FIG. 3, the antenna structure A of FIG. 3 is similar to the antenna structure A of FIG. 2, and the difference is the composition of the third radiating portion 3. The third radiating portion 3 of FIG. 2 is a metal component made of iron, which is a harder material that is able to connect to the edge of the substrate S in a direction perpendicular to the substrate S, and so the antenna structure A of FIG. 2 is a three-dimensional structure, where the third radiating portion 3 is disposed along the z-axis direction and the substrate is parallel to the xy-plane. In comparison, the third radiating portion 3 of FIG. 3 is a copper foil and is formed on the substrate S like the first radiating portion 1 and the second radiating portion 2, and so the antenna structure A of FIG. 3 is a planar structure, where the third radiating portion 3 is also parallel to the xy-plane.

However, the aforementioned details are disclosed for exemplary purposes only, and are not meant to limit the scope of the present disclosure.

Second Embodiment

Figure 4:
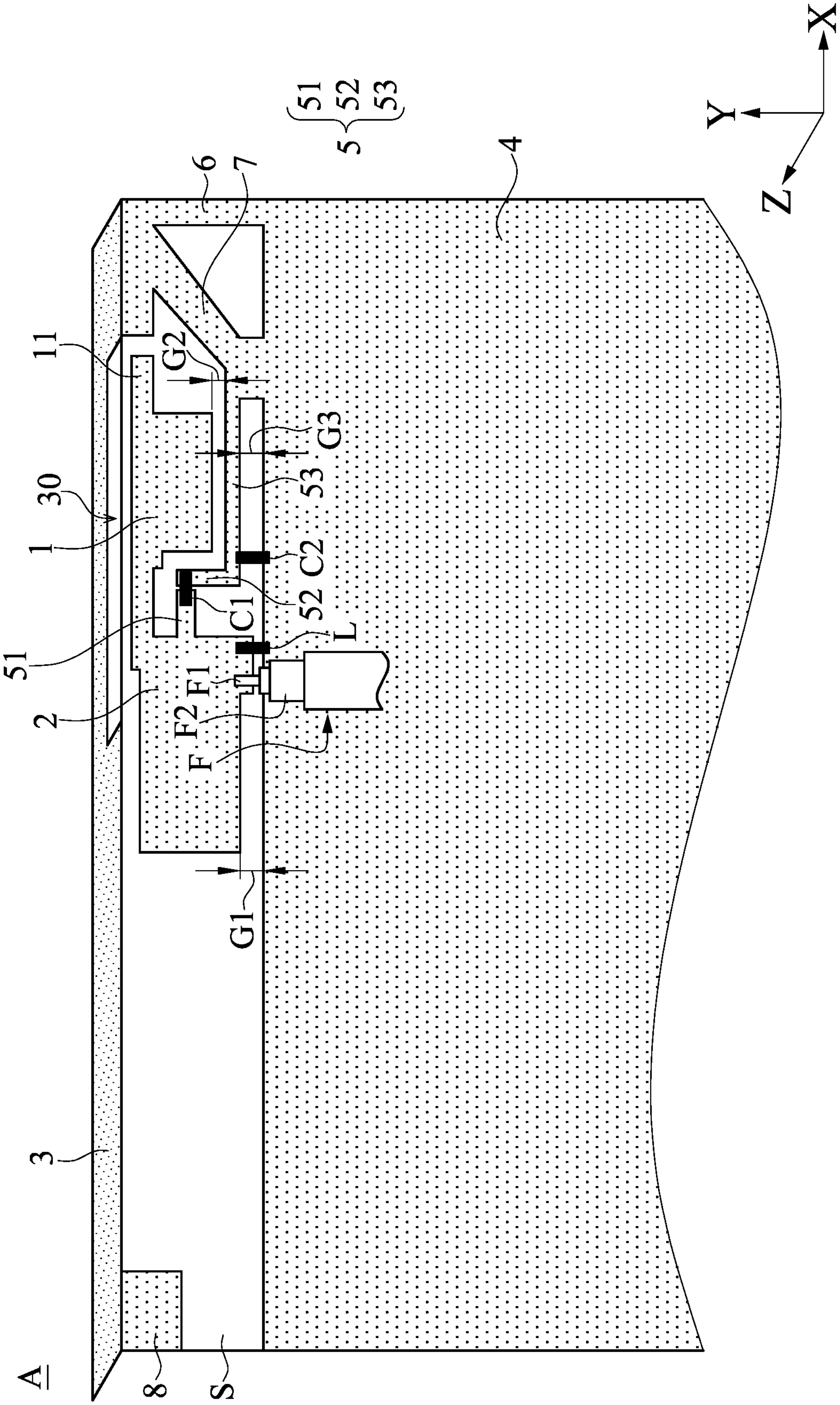
FIG. 4 is a schematic view of an antenna structure according to a second embodiment.

Referring to FIG. 4 and FIG. 5, the antenna structure A of FIG. 4 is a three-dimensional structure and includes, the substrate S, the first radiating portion 1, the second radiating portion 2, the third radiating portion 3 which is perpendicular to the substrate S, the grounding portion 4, the shorting portion 5, the first grounding extension portion 6, and the first capacitive element C1, an inductive element L and a second capacitive element C2. The inductive element L has an inductance of 10 nH to 20 nH, for example, it may be 16 nH, and the second capacitive element C2 has a capacitance of 0.4 pF to 1.8 pF, for example, it may be 0.6 pF, but the present disclosure is not limited thereto. The inductive element L is coupled between the second radiating portion 2 and the grounding portion 4, and the second capacitive element C2 is coupled between the shorting portion 5 and the grounding portion 4. The part of the third radiating portion 3 located at the periphery of the opening 30, the first radiating portion 1, the shorting portion 5, the first rounding extension portion 6, and the inductive element L work together to excite and generate a third operating frequency band R3. As shown in FIG. 5, the third operating frequency band R3 is higher than the first operating frequency band R1, and the third operating frequency band R3 is lower than the second operating frequency band R2. The third operating frequency band R3 is from 698 MHz to 960 MHz. By conducting the matching of the third operating frequency band R3 with the inductive element L, the present disclosure generates dual-modes in the low frequency range (617 MHz to 960 MHz), which are the first operating frequency band R1 and the third operating frequency band R3.

Referring to FIG. 4 and FIG. 5, the first radiating portion 1, the shorting portion 5, and the second capacitive element C2 together generate a fourth operating frequency band R4. As shown in FIG. 5, the fourth operating frequency band R4 is higher than the second operating frequency band R2, and the fourth operating frequency band R4 is from 2200 MHz to 2690 MHz. In specific, the coupling between the first radiating portion 1 and the shorting portion 5 generates a frequency band in the intermediate frequency range (1450 MHz to 2690 MHz). By using the first capacitive element C1 to conduct the matching of the first mode in the intermediate frequency range, the second operating frequency band R2 is achieved, and by using the second capacitive element C2 to conduct the matching of the second mode in the intermediate frequency range, the fourth operating frequency band R4 is achieved. Hence, dual-modes are generated in the intermediate frequency range. Furthermore, in this embodiment, the first radiating portion 1 of FIG. 4 further includes a protruding portion 11 that extends along the positive x-axis direction. The protruding portion 11 is used to couple the third radiating portion 3 on the top so as to further adjust the matching of the fourth operating frequency band R4, and as such, the adjustment of the dual-modes frequency in the intermediate frequency range is achieved.

Furthermore, the second radiating portion 2 and the grounding portion 4 couple with each other to generate a fifth operating frequency band R5, and the first radiating portion 1 is used to couple with the part of the third radiating portion 3 at the periphery of the opening 30 to generate a sixth operating frequency band R6. As shown in FIG. 5, the sixth operating frequency band R6 is higher than the fifth operating frequency band R5, and the fifth operating frequency band R5 is higher than the fourth operating frequency band R4. The fifth operating frequency band R5 is from 3300 MHz to 4700 MHz, and the sixth operating frequency band R6 is from 4700 MHz to 5925 MHz.

There is a first coupling gap G1 between the second radiating portion 2 and the grounding portion 4, and by adjusting the size of the first coupling gap G1, the impedance matching of the fifth operating frequency band R5 is optimized. There is a second coupling gap G2 between the third section 53 and the first radiating portion 1, and the frequency bandwidth of the intermediate frequency range (1450 MHz-2690 MHz) is adjustable by adjusting the size of the second coupling gap G2. There is a third coupling gap G3 between the third section 53 and the grounding portion 4, and the impedance match in the fourth operating frequency band R4 can be optimized by adjusting the size of the third coupling gap G3. The first coupling gap G1, the second coupling gap G2, and the third coupling gap G3 are all less than or equal to 3 mm.

Referring to FIG. 4, the antenna structure A further includes a second grounding extension portion 7. The second grounding extension portion 7 extends in a slanted direction relative to the first grounding extension portion 6 and is connected between the first grounding extension portion 6 and the third section 53 of the shorting portion 5. More specifically, one end of the second grounding extension portion 7 is connected with the first grounding extension portion 6, and so the two are jointly connected to the third radiating portion 3. The other end of the second grounding extension portion 7 is jointed with the third section 53 of the shorting portion 5, and so the two are together connected to the grounding portion 4. Therefore, the first radiating portion 1 can couple with the first grounding extension portion 6 and the second grounding extension portion 7 at the same time, so as to adjust the impedance match in the low frequency range (617 MHz-960 MHz) by coupling with multiple paths (the first grounding extension portion 6 and the second grounding extension portion 7).

BENEFICIAL EFFECTS OF THE EMBODIMENTS

In conclusion, the present disclosure provides an electronic device D that supports a full frequency band of LTE (617 MHz-5925 MHz), low frequency range inclusive, as shown in FIG. 5 through the design of the internal antenna structure A, which generates a first operating frequency band R1, a second operating frequency band R2, a third operating frequency band R3, a fourth operating frequency band R4, a fifth operating frequency band R5, and a sixth operating frequency band R6.

Furthermore, through the structural design, the antenna structure A of the present disclosure is reduced in size and can be implemented inside an electronic device D with narrow bezel. For example, the antenna structure A shown in FIG. 4 is kept within a 10.5 mm width in the y-axis and a 3.5 mm height in the z-axis, and the electronic device D is a tablet computer or a laptop computer. Hence, in summary, the present disclosure provides an antenna structure A that not only fulfills the esthetic requirement of the electronic device being thin and light, but also maintains the communication quality of the electronic device D.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a substrate;

a first radiating portion disposed on the substrate;

a second radiating portion disposed on the substrate and connected to the first radiating portion;

a grounding portion disposed on the substrate;

a shorting portion connected between the second radiating portion and the grounding portion and disposed closer to the grounding portion than the first radiating portion, the shorting portion further comprising a first section, a second section, and a third section, wherein the first section is connected to the second radiating portion, and the third section is connected between the second section and the grounding portion;

a third radiating portion disposed on the substrate;

a first grounding extension portion connected between the third radiating portion and the grounding portion;

a feeding element disposed on the substrate and coupled between the second radiating portion and the grounding portion for feeding a signal; and a first capacitive element disposed on the substrate and coupled between the first section and the second section;

wherein the shorting portion, the first grounding extension portion, and the third radiating portion generate a first operating frequency, the first radiating portion, the shorting portion, the first grounding extension portion, and the third radiating portion couple with each other to generate a second operating frequency band through a matching of the first capacitive element, and the second operating frequency band is higher than the first operating frequency band;

wherein the third section is located between the first radiating portion and the grounding portion, and the first radiating portion is located between the third section and the third radiating portion.

2. The electronic device according to claim 1, further comprising an inductive element coupled between the second radiating portion and the grounding portion, wherein the third radiating portion comprises an opening, the first radiating portion, a part of the third radiating portion at a periphery of the opening, the shorting portion, the first grounding extension portion, and the inductive element are used to generate a third operating frequency band, and the third operating frequency band is higher than the first operating frequency band but lower than the second operating frequency band.

3. The electronic device according to claim 2, further comprising a second capacitive element coupled between the shorting portion and the grounding portion, wherein the first radiating portion, the shorting portion, and the second capacitive element are used to generate a fourth operating frequency band, and the fourth operating frequency band is higher than the second operating frequency band.

4. The electronic device according to claim 3, wherein the second radiating portion and the grounding portion couple with each other to generate a fifth operating frequency band, and the fifth operating frequency band is higher than the fourth operating frequency band.

5. The electronic device according to claim 4, wherein the opening is adjacent to the first radiating portion, the first radiating portion couples with the part of the third radiating portion at the periphery of the opening to generate a sixth operating frequency band, and the sixth operating frequency band is higher than the fifth operating frequency band.

6. The electronic device according to claim 1, wherein a first coupling gap is formed between the second radiating portion and the grounding portion, and the first coupling gap is less than 3 mm.

7. The electronic device according to claim 1, wherein a second coupling gap is formed between the third section and the first radiating portion, and the second coupling gap is less than 3 mm.

8. The electronic device according to claim 1, wherein a third coupling gap is formed between the third section and the grounding portion, and the third coupling gap is less than 3 mm.

9. The electronic device according to claim 1, further comprising a second grounding extension portion, wherein the second grounding extension portion extends slanted relative to the first grounding extension portion and is connected between the first grounding extension portion and the third section of the shorting portion.

10. An antenna structure, comprising:

a substrate;

a first radiating portion disposed on the substrate;

a second radiating portion disposed on the substrate and connected to the first radiating portion, wherein the second radiating portion is used to couple with a feeding element, and a signal is fed through the feeding element;

a grounding portion disposed on the substrate;

a shorting portion connected between the second radiating portion and the grounding portion and disposed closer to the grounding portion than the first radiating portion, the shorting portion comprising a first section, a second section, and a third section, wherein the first section is connected to the second radiating portion, and the third section is connected between the second section and the grounding portion;

a third radiating portion disposed on the substrate;

a first grounding extension portion connected between the third radiating portion and the grounding portion; and a first capacitive element disposed on the substrate and coupled between the first section and the second section;

wherein the shorting portion, the first grounding extension portion, and the third radiating portion couple with each other to generate a first operating frequency band, the first radiating portion, the shorting portion, the first grounding extension portion, and the third radiating portion couple with each other to generate a second operating frequency band through a matching of the first capacitive element, and the second operating frequency band is higher than the first operating frequency band;

wherein the third section is located between the first radiating portion and the grounding portion, and the first radiating portion is located between the third section and the third radiating portion.

11. The antenna structure according to claim 10, further comprising an inductive element coupled between the second radiating portion and the grounding portion, wherein the third radiating portion comprises an opening, the first radiating portion, a part of the third radiating portion at a periphery of the opening, the shorting portion, the first grounding extension portion, and the inductive element are used to generate a third operating frequency band, and the third operating frequency band is higher than the first operating frequency band but lower than the second operating frequency band.

12. The antenna structure according to claim 11, further comprising a second capacitive element coupled between the shorting portion and the grounding portion, wherein the first radiating portion, the shorting portion, and the second capacitive element are used to generate a fourth operating frequency band, and the fourth operating frequency band is higher than the second operating frequency band.

13. The antenna structure according to claim 12, wherein the second radiating portion and the grounding portion couple with each other to generate a fifth operating frequency band, and the fifth operating frequency band is higher than the fourth operating frequency band.

14. The antenna structure according to claim 13, wherein the opening is adjacent to the first radiating portion, the first radiating portion couples with the part of the third radiating portion at the periphery of the opening to generate a sixth operating frequency band, and the sixth operating frequency band is higher than the fifth operating frequency band.

15. The antenna structure according to claim 10, further comprising a second grounding extension portion, wherein the second grounding extension portion extends slanted relative to the first grounding extension portion and is connected between the first grounding extension portion and the third section of the shorting portion.

* * * * *